US009282505B1

(12) United States Patent
Sitaram et al.

(10) Patent No.: US 9,282,505 B1
(45) Date of Patent: Mar. 8, 2016

(54) SYSTEMS AND METHODS OF WIRELESS COMMUNICATION ACCESS CONTROL

(71) Applicant: Sprint Spectrum LP, Overland Park, KS (US)

(72) Inventors: Krishna Sitaram, Chantilly, VA (US); Daniel Vivanco, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 323 days.

(21) Appl. No.: 13/749,586

(22) Filed: Jan. 24, 2013

(51) Int. Cl.
*H04W 4/00* (2009.01)
*H04W 48/16* (2009.01)

(52) U.S. Cl.
CPC .................................... *H04W 48/16* (2013.01)

(58) Field of Classification Search
CPC . H04W 36/12; H04W 36/0061; H04W 36/00; H04W 76/04; H04W 36/14; H04W 40/36; H04W 48/18; H04W 48/20; H04W 24/02; H04W 28/08; H04W 36/22; H04W 76/028; H04W 36/04; H04W 48/06; H04W 60/00
USPC ................ 455/434, 67.13, 436, 73, 446, 423; 370/468, 328
See application file for complete search history.

(56) References Cited

U.S. PATENT DOCUMENTS

| | | | | |
|---|---|---|---|---|
| 2003/0087641 | A1* | 5/2003 | Gustafsson | 455/446 |
| 2003/0095572 | A1* | 5/2003 | Efthymiou | 370/468 |
| 2008/0227453 | A1* | 9/2008 | Somasundaram et al. | 455/436 |
| 2009/0190500 | A1* | 7/2009 | Ji et al. | 370/254 |
| 2009/0247164 | A1* | 10/2009 | Kandukuri Narayan et al. | 455/436 |
| 2010/0151799 | A1* | 6/2010 | Kim et al. | 455/73 |
| 2011/0306307 | A1* | 12/2011 | Kauppert et al. | 455/67.13 |
| 2013/0109394 | A1* | 5/2013 | Rangaiah et al. | 455/437 |

* cited by examiner

*Primary Examiner* — Kwasi Karikari

(57) ABSTRACT

In systems and methods of wireless communication access control, link budget parameters are determined for an access node, and a network access criteria is calculated based on the determined link budget parameters. In embodiments, an offset value is applied to the network access criteria. The network access criteria is provided from the access node to a wireless device. When a signal level of the access node meets the network access criteria, a network access request is received from the wireless device.

16 Claims, 6 Drawing Sheets

SYSTEMS AND METHODS OF WIRELESS COMMUNICATION ACCESS CONTROL

TECHNICAL BACKGROUND

Wireless devices permit access to a wide array of communication and data services, including interconnect and dispatch voice services as well as a variety of other services including email, messaging, internet access, and the like. When a wireless device attempts to establish initial communication with an access node, an initial network access process is used. A wireless device attempting to establish communications with a communication system must meet certain requirements, among them a minimum acceptable measured received signal level value.

OVERVIEW

In operation, link budget parameters are determined for an access node. A network access criteria is calculated based on the determined link budget parameters. In an embodiment, a network access criteria offset value can be determined based on one or more conditions, and the offset value can be applied to the network access criteria. The network access criteria is provided from the access node to a wireless device. When a signal level of the access node meets the network access criteria, a network access request is received from the wireless device.

DETAILED DESCRIPTION

Figure 1:
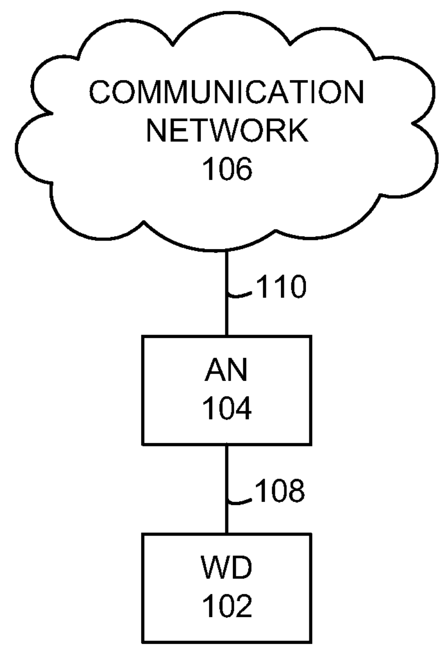
FIG. 1 illustrates an exemplary communication system for wireless communication access.
Figure 1:
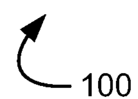

FIG. 1 illustrates an exemplary communication system 100 for wireless communication access control comprising wireless device 102, access node 104 and communication network 106. Examples of wireless device 102 can comprise a cell phone, a smart phone, a computing platform such as a laptop, palmtop, or tablet, a personal digital assistant, or an internet access device, including combinations thereof. Wireless device 102 is in communication with access node 104 over communication link 108.

Access node 104 is a network node capable of providing wireless communications to wireless device 102, and can be, for example, a base transceiver station, a radio base station, an eNodeB device, or an enhanced eNodeB device. Access node 104 is in communication with communication network 106 over communication link 110.

Communication network 106 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 106 can be capable of carrying communication information, for example, to support communications by a wireless device such as wireless device 102. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 106 may also comprise base stations, controller nodes, telephony switches, internet routers, network gateways, computer systems, communication links, or some other type of communication equipment, and combinations thereof.

Communication links 108 and 110 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104 and communication network 106 which are omitted for clarity, including additional processing nodes, routers, gateways, and physical and/or wireless data links for carrying data among the various network elements.

Figure 2:
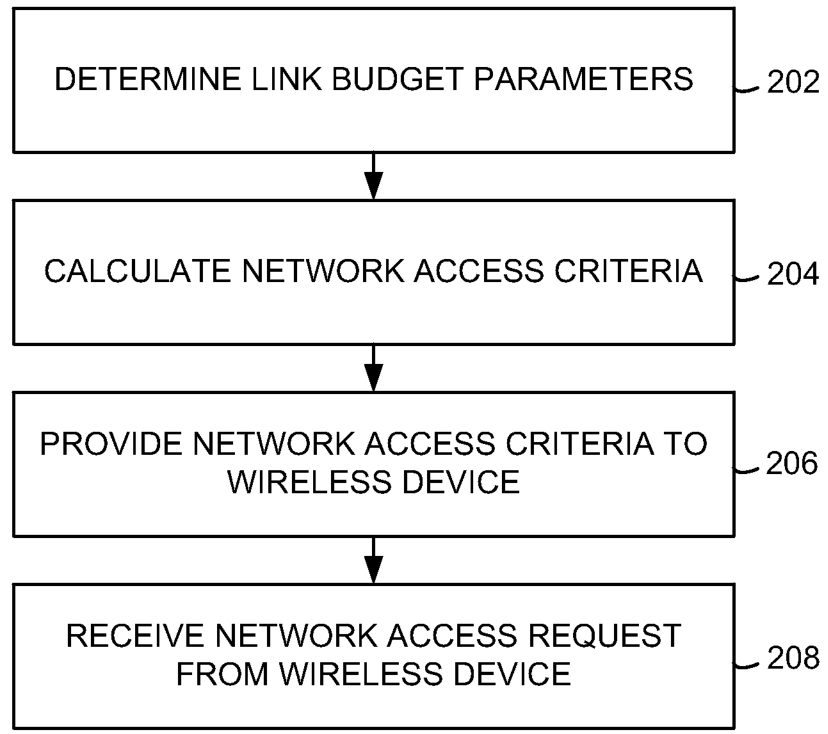
FIG. 2 illustrates an exemplary method of wireless communication access control.

FIG. 2 illustrates an exemplary method of wireless communication access control. In operation 202, link budget parameters are determined. For example, access node 104 can determine a link budget comprising a plurality of parameters. A link budget comprises a mechanism by which a network access configuration is determined. A variety of parameters can influence the network access configuration, including, by way of example, a power per resource block, an average power per resource element, an equivalent isotropically radiated power (EIRP), a noise floor per resource block, and the like. Each parameter can be determined based on measurements or predetermined values.

In operation 204, a network access criteria is calculated. The network access criteria can be calculated based on the determined link budget parameters. For example, access node 104 can calculate the network access criteria based on the determined link budget parameters.

A wireless device attempting to establish communications with a communication system must meet certain requirements, among them a minimum acceptable measured received signal level value. A minimum signal level can be represented, for example, by a QrxLevMin value or other similar value. In an embodiment, QrxLevMin represents the minimum signal level measured by wireless device at which the wireless device will be allowed access to wireless communication. A signal level can comprise, for example, a signal strength value such as a reference signal received power (RSRP), a received signal strength indicator (RSSI), a signal to interference-plus-noise ratio (SINR), a carrier to interference-plus-noise ratio (CINR), and so forth. In an embodiment, a QrxLevMin value can be a network access criteria.

In operation 206, the network access criteria are provided to a wireless device. For example, the network access criteria can be provided by access node 104 to wireless device 102. In an embodiment, the network access criteria is provided to wireless device 102 by access node 104 over communication link 108. In an embodiment, access node 104 provides a QrxLevMin value to wireless device 102.

In operation 208, a network access request is received from the wireless device. For example, a network access request can be received at access node 104 from wireless device 102 over communication link 108. The network access request can be received from wireless device 102 based on the provided network access criteria. For example, wireless device 102 can compare the network access criteria with a determined signal level from access node 104, and based on the comparison wireless device 102 can determine if the determined signal level meets the network access criteria. When the determined signal level meets the network access criteria, wireless device 102 can send a network access request to access node 104.

Figure 3:
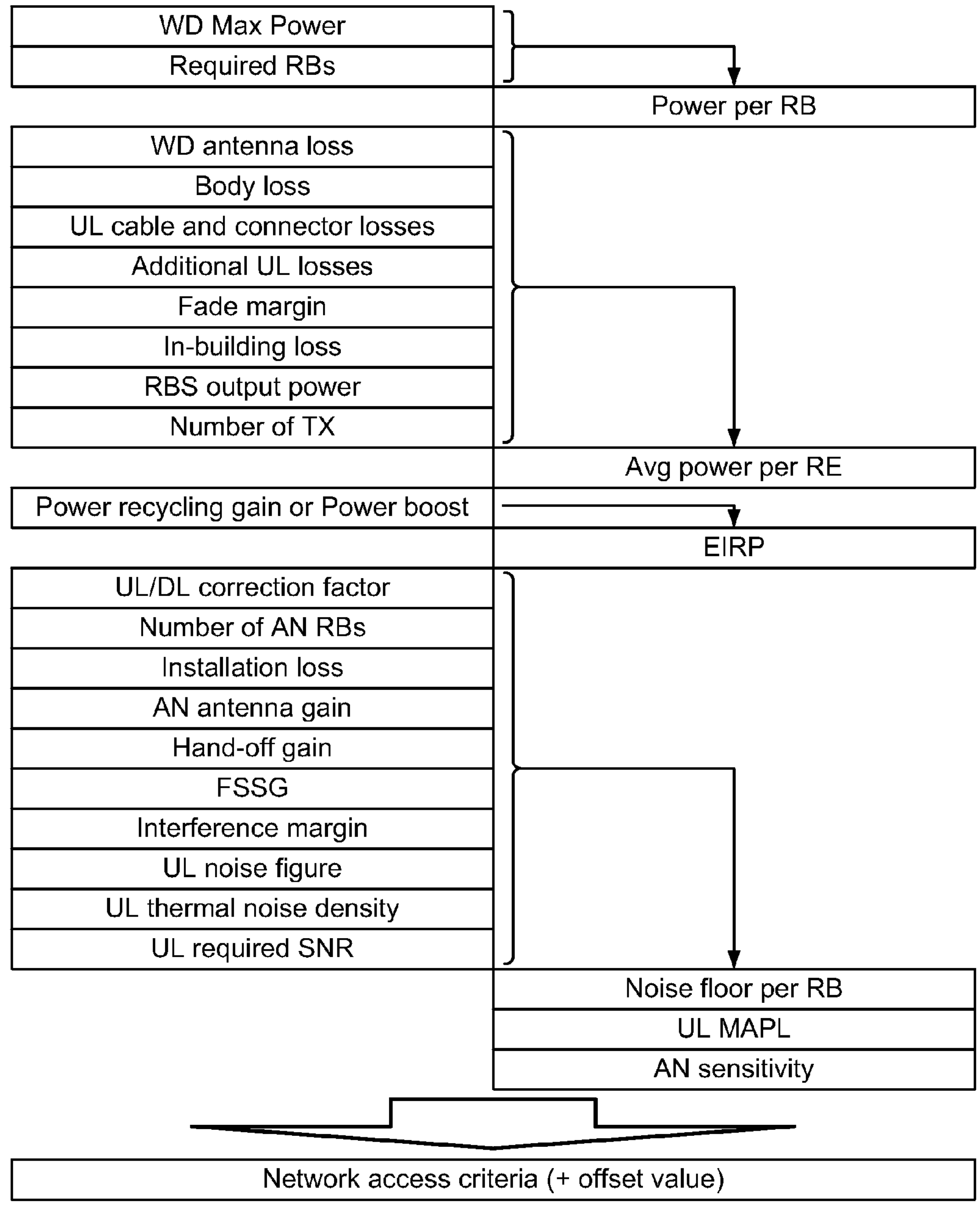
FIG. 3 illustrates an exemplary link budget table.

FIG. 3 illustrates an exemplary link budget table 300. A link budget comprises an accounting of gains and losses from an access node over a wireless communication link. For example, a link budget of access node 104 can account for conditions of communication link 108. A link budget can be used to determine network access configuration settings.

Link budget table 300 comprises a variety of exemplary link budget parameters. The link budget parameters in link budget table 300 comprise parameters for both and uplink portion and a downlink portion of communication link 108, but this is merely exemplary, and separate tables for uplink and downlink portions can also be maintained. Uplink parameters can comprise uplink cable and connector losses, a noise figure, a thermal noise density, a required signal-to-noise ratio, and the like. Downlink parameters can comprise an in-building loss, a fade margin, a number of transmissions, and the like. In an embodiment, parameters in the left hand column can be configured values, for example, configured by a network operator, and parameters in the right hand column can be calculated based on at least one of the configured values, as indicated by the arrows in FIG. 3. A network access criteria can thus be calculated based on all of the parameters of the link budget table.

In addition, an offset value can be determined. The offset value can be used to change the network access criteria, and can be determined according to a plurality of factors. For example, the offset value can be determined to raise the network access criteria for wireless devices which are relatively distant from access node 104. In an embodiment, when a wireless device is located near the edge of a coverage area of access node 104, an offset value can be determined to raise the network access criteria for the wireless device, raising the minimum requirements for access to wireless communication at access node 104. Similarly, an offset value can be determined to lower the network access criteria for a wireless device which is relatively close to access node 104, reducing the minimum requirements for access to wireless communication at access node 104.

As another example, based on a utilization history of a communication link, utilization patterns or trends can be determined, and an offset value can be determined based on communication link utilization patterns. For example, an offset value can be determine to raise the network access criteria for the wireless device during a time or times of higher utilization, raising the minimum requirements for access to wireless communication at access node 104. Similarly, an offset value can be determined to lower the network access criteria for the wireless device during a time or times of lower utilization, reducing the minimum requirements for access to wireless communication at access node 104. What constitutes a time of higher or lower utilization can be based on a location of an access node. For example, an access node near an area predominated by businesses may tend to have higher utilization during business hours and lower utilization during evenings, nights, and weekends, while an access node near a predominantly residential area may tend to have lower utilization during business and/or school hours, and may tend to have higher utilization during evenings, nights, and weekends. Other variations in access node utilization can be monthly, seasonal, and the like, dependent at least in part on the particular utilization history determined by the access node.

As another example, an offset value can be determined based on a loading of a communication link. For example, access node 104 can determine a loading of communication link 108. The loading of communication link 108 can be based on application requirements of wireless devices in communication with access node 104, or a number of wireless devices in communication with access node 104, a number of wireless devices requesting to communicate with access node 104, and the like. In an embodiment, when a loading of communication link 108 meets or exceeds a loading threshold, the offset value can be determined to raise the network access criteria for the wireless device, raising the minimum requirements for access to wireless communication at access node 104. In an embodiment, when a loading of communication link 108 meets or is less than a second loading threshold, an offset value can be determined to lower the network access criteria for a wireless device, reducing the minimum requirements for access to wireless communication at access node 104.

In an embodiment, link budget table 300 can be stored and updated by access node 104, which can also calculate parameters based on configured parameters, and calculate the network access criteria. In an embodiment, link budget table 300 can be maintained and updated, and the above-described calculations can be performed, by another network element of communication system 100.

Figure 4:
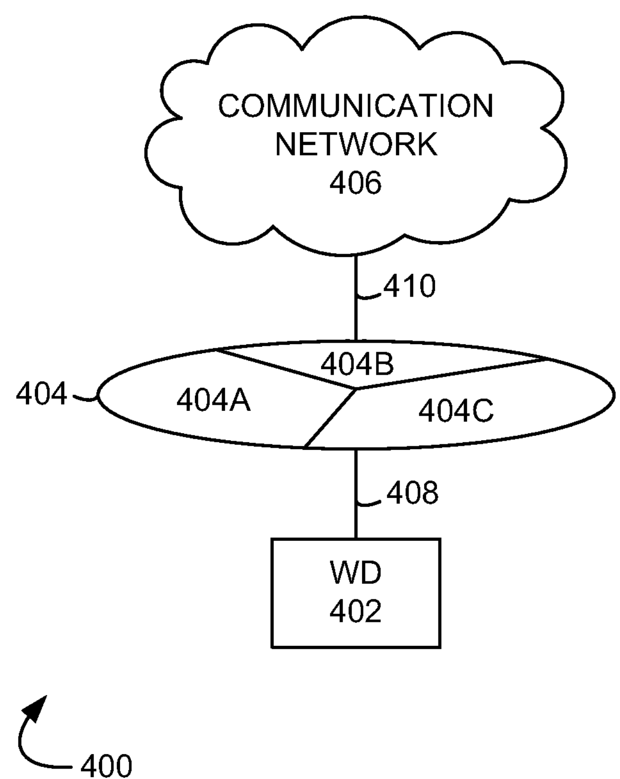
FIG. 4 illustrates another exemplary communication system for wireless communication access control.

FIG. 4 illustrates an exemplary communication system 400 for wireless communication access control comprising wireless device 402, access node 404 and communication network 406. Examples of wireless device 402 can comprise a cell phone, a smart phone, a computing platform such as a laptop, palmtop, or tablet, a personal digital assistant, or an internet access device, including combinations thereof. Wireless device 402 is in communication with access node 404 over communication link 408.

Access node 404 is a network node capable of providing wireless communications to wireless device 402, and can be, for example, a base transceiver station, a radio base station, an eNodeB device, or an enhanced eNodeB device. Access node 104 is in communication with communication network 106 over communication link 110.

Access node 404 may comprise a coverage area for wireless communication, and further the coverage area of access node 404 may be divided into two or more areas, such as sectors or some other division of the coverage area. For example, as illustrated in FIG. 4, access node 404 may comprise sectors 404A, 404B and 404C. Access node 404 may communicate with each of its sectors independently from its other sectors, such as with a dedicated transceiver and/or other communication equipment for each sector. Access node is in communication with communication network 406 over communication link 410.

Communication network 406 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 406 can be capable of carrying communication information, for example, to support communications by a wireless device such as wireless device 402. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 406 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 406 may also comprise base stations, controller nodes, telephony switches, internet routers, network gateways, computer systems, communication links, or some other type of communication equipment, and combinations thereof.

Communication links 408 and 410 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 404 and communication network 406 which are omitted for clarity, including additional processing nodes, routers, gateways, and physical and/or wireless data links for carrying data among the various network elements.

Figure 5:
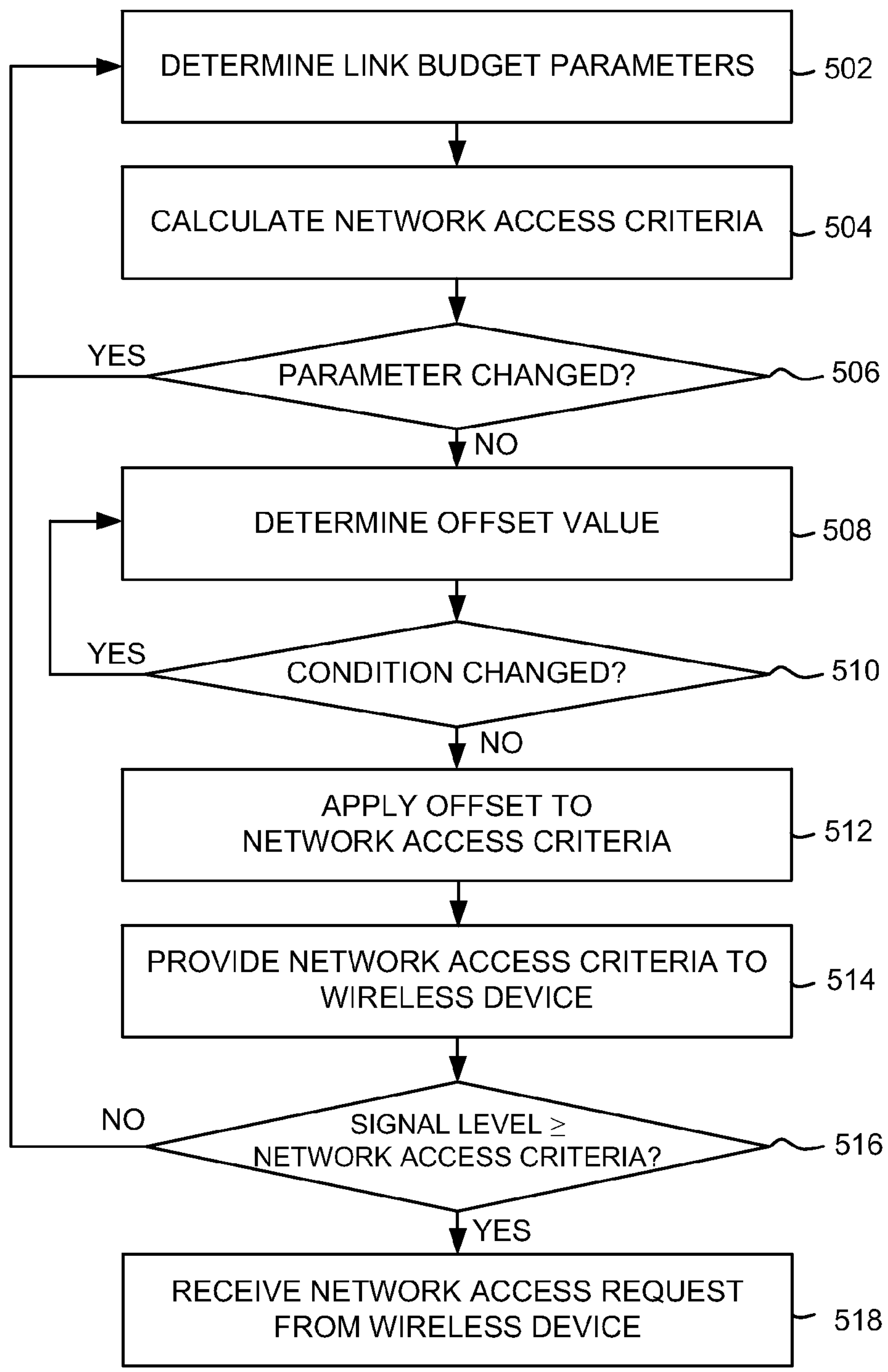
FIG. 5 illustrates another exemplary method of wireless communication access control.

FIG. 5 illustrates another exemplary method of wireless communication access control. In operation 502, link budget parameters are determined. For example, access node 404 can determine a link budget comprising a plurality of parameters. A link budget can be determined by access node 404 for one or more sectors of access node 404, such as sector 404A, 404B, and/or 404C. A variety of parameters can influence the network access configuration, and each parameter can be determined based on measurements or predetermined values.

In operation 504, a network access criteria is calculated. The network access criteria can be calculated based on the determined link budget parameters. For example, access node 404 can calculate the network access criteria based on the determined link budget parameters. If a parameter changes (operation 506-YES) then the link budget parameters can be redetermined and the network access criteria can be recalculated. Parameters can change, for example, according to changes in the wireless communication environment, or because of mobility of a wireless device, or because they are changes by a network operators. Other changes to parameters are also possible. In an embodiment, the network access criteria can be calculated for one or more sectors of access node 404.

In operation 508, an offset value is determined. The offset value can be used to change the network access criteria, and can be determined according to a variety of conditions or factors. For example, the offset value can be based on a determined location of wireless device 402. The offset value can also be based on a loading of access node 404. The offset value can also be based on a loading of a sector of access node 404, such as sector 404A, 404B, or 404C. The offset value can also be based on a historical loading of access node 404, or of a sector of access node 404, such as historical utilization patterns or trends.

Further, the offset value can be changed in response to changes in a condition or factor (operation 510-YES). For example, wireless device 402 can be highly mobile, and may move toward access node 404, or away from access node 404 toward an edge of a coverage area of access node 404. A change in the location of wireless device 402 can be determined, for example, based on information sent by wireless device 402 to access node 404, or based on information determined by another network element of communication system 400. As another example, utilization patterns of access node 404, network conditions including network congestion and communication link loading, and the like can change, and the changed condition or conditions can be used to redetermine the offset value.

When offset value conditions do not change (operation (510—NO), the offset value is applied to the network access criteria. Application of the offset value can increase or reduce the reducing the minimum requirements for access by wireless device 402 to wireless communication at access node 404. In an embodiment, the offset value is determined and applied to a network access criteria for one or more sectors of access node 404.

In an embodiment, link budget table 300 can be stored and updated by access node 404, which can also calculate parameters based on configured parameters, and calculate the network access criteria. In an embodiment, link budget table 300 can be maintained and updated, and the above-described calculations can be performed, by another network element of communication system 400.

In operation 514, the network access criteria is provided to a wireless device. For example, the network access criteria can be provided by access node 404 to wireless device 402. In an embodiment, the network access criteria is provided to wireless device 102 in one sector of access node 404 over communication link 408. In an embodiment, access node 404 provides a QrxLevMin value which has been modified by an offset value to wireless device 402.

In operation 516, it is determined whether a signal level is greater than or equal to the network access criteria. For wireless device 402 to attempt to establish communications with access node 404, certain minimum requirements must be met, including a minimum acceptable measured received signal level value. A signal level can comprise, for example, a signal strength value such as a reference signal received power (RSRP), a received signal strength indicator (RSSI), a signal to interference-plus-noise ratio (SINR), a carrier to interference-plus-noise ratio (CINR), and so forth. In an embodiment, the received signal level must meet the network access criteria. For example, wireless device 402 can compare the network access criteria with a determined signal level from access node 404, and based on the comparison wireless device 402 can determine whether the determined signal level meets the network access criteria. When the determined signal level meets the network access criteria, wireless device 402 can send a network access request to access node 404 via one of sectors 404A, 404B and 404C. When the signal level does not meet the network access criteria (operation 516—NO), link budget parameters can be re-determined.

When the signal level meets the network access criteria (operation 816—YES), a network access request is received from the wireless device (operation 518). For example, a network access request can be received at a sector of access node 404 (such as sector 404A, 404B, or 404C) from wireless device 402 over communication link 408. The network access request can be received from wireless device 402 based on the provided network access criteria. When then network access request is received from wireless device 402, access node 404 can proceed with a wireless communication admission process.

Figure 6:
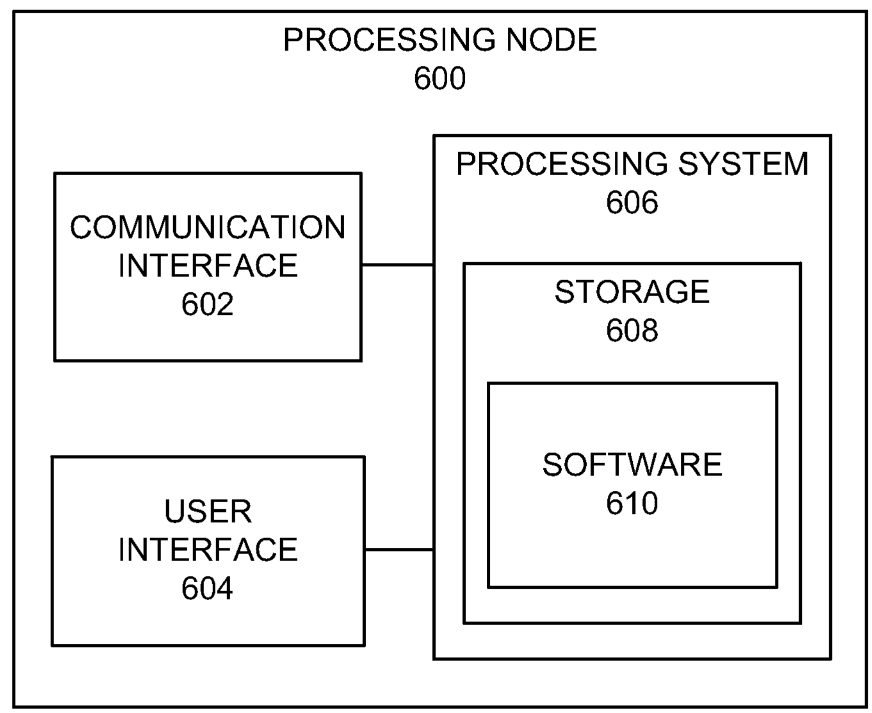
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 is capable of methods of wireless communication access control. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include access node 104 and access node 404. Processing node can also be an adjunct or component of a network element, such as an element of access node 104 or access node 404. Processing node 600 can be another network element in a communication system, and the functionality of processing node 600 can also be distributed over two or more network elements.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of wireless device communication, comprising:

determining link budget parameters for an access node, the link budget parameters being stored in a link budget table at the access node;

calculating a network access criteria based on the determined link budget parameters and a network access criteria offset value, wherein the network access criteria offset value is calculated based on a historical utilization pattern of at least one sector of the access node and applied to the calculated network access criteria;

providing the network access criteria from the access node to a wireless device;

re-calculating the network access criteria offset value based on mobility information of the wireless device received at the access node and applying the re-calculated network access criteria offset value to the network access criteria;

comparing the re-calculated network access criteria offset value to a signal level of the access node and, based on the comparison, determining whether the signal level meets the re-calculated network access criteria; and when the signal level meets the re-calculated network access criteria, receiving a network access request at the access node from the wireless device.

2. The method of claim 1, wherein the link budget parameters are determined for the at least one sector of the access node.

3. The method of claim 2, wherein the network access criteria is calculated for the at least one sector of the access node.

4. The method of claim 1, further comprising:

determining that one of the link budget parameters has changed; and re-calculating the network access criteria based on the changed link budget parameter.

5. The method of claim 1, wherein the link budget parameters comprise at least one of a power per resource block, an average power per resource element, a radiated power metric, a noise floor per resource block, and a maximum allowed path loss.

6. The method of claim 1, further comprising calculating a network access criteria based on the determined link budget parameters and the network access criteria offset value, wherein the offset value is further based on a loading of the at least one sector of the access node.

7. The method of claim 1, further comprising calculating a network access criteria based on the determined link budget parameters and the network access criteria offset value, wherein the offset value is further based on a historical loading of the access node.

8. The method of claim 1, further comprising calculating a network access criteria based on the determined link budget parameters and the network access criteria offset value, wherein the offset value is further based on a determined location of the wireless device.

9. A system for wireless device communication, comprising:

a processing node configured to:

determine link budget parameters for an access node and store the link budget parameters in a link budget table;

calculate a network access criteria based on the determined link budget parameters and a network access criteria offset value, wherein the network access criteria offset value is calculated based on a historical utilization pattern of at least one sector of the access node and applied to the calculated network access criteria;

provide the network access criteria from the access node to a wireless device;

re-calculate the network access criteria offset value based on mobility information of the wireless device received at the access node and apply the re-calculated network access criteria offset value to the network access criteria;

compare the re-calculated network access criteria offset value to a signal level of the access node and, based on the comparison, determine whether the signal level meets the re-calculated network access criteria; and when the signal level meets the re-calculated network access criteria, receive a network access request at the access node from the wireless device.

10. The system of claim 9, wherein the link budget parameters are determined for the at least one sector of the access node.

11. The system of claim 10, wherein the network access criteria is calculated for the at least one sector of the access node.

12. The system of claim 9, wherein the processing node is further configured to:

determine that one of the link budget parameters has changed; and re-calculate the network access criteria based on the changed link budget parameter.

13. The system of claim 9, wherein the link budget parameters comprise at least one of a power per resource block, an average power per resource element, a radiated power metric, a noise floor per resource block, and a maximum allowed path loss.

14. The system of claim 9, wherein the processing node is further configured to:

calculate a network access criteria based on the determined link budget parameters and the network access criteria offset value, wherein the offset value is further based on a loading of the at least one sector of the access node.

15. The system of claim 9, wherein the processing node is further configured to:

calculate a network access criteria based on the determined link budget parameters and the network access criteria offset value wherein, the offset value is further based on a historical loading of the access node.

16. The system of claim 9, wherein the processing node is further configured to:

calculate a network access criteria based on the determined link budget parameters and the network access criteria offset value, wherein the offset value is further based on a determined location of the wireless device.

* * * * *